United States Patent [19]
Sakai

[11] Patent Number: 5,098,152
[45] Date of Patent: Mar. 24, 1992

[54] AUTOMOTIVE POWER SUNROOF

[75] Inventor: Kunio Sakai, Yokohama, Japan

[73] Assignee: Ohi Seisakusho Co., Ltd., Yokohama, Japan

[21] Appl. No.: 631,923

[22] Filed: Dec. 20, 1990

[30] Foreign Application Priority Data

Dec. 26, 1989 [JP] Japan .............................. 1-148715[U]
Dec. 26, 1989 [JP] Japan .................... 1-335051

[51] Int. Cl.$^5$ .............................................. B60J 7/05
[52] U.S. Cl. .................................... 296/223; 296/221; 318/286; 318/468
[58] Field of Search ................. 296/217, 221, 223; 318/467, 468, 265, 286

[56] References Cited

U.S. PATENT DOCUMENTS

| | | | |
|---|---|---|---|
| 4,502,726 | 3/1985 | Adams | 296/221 |
| 4,596,419 | 6/1986 | Masuda | 296/221 |
| 4,629,953 | 12/1986 | Inoue et al. | 296/223 X |
| 4,841,205 | 6/1989 | Bekkema | 318/468 X |
| 4,869,548 | 9/1989 | Nagata et al. | 296/223 X |
| 4,893,870 | 1/1990 | Moriya et al. | 296/223 |
| 4,923,246 | 5/1990 | Takahashi et al. | 296/221 |

FOREIGN PATENT DOCUMENTS 59-202934 11/1984 Japan .

Primary Examiner—Dennis H. Pedder
Attorney, Agent, or Firm—Foley & Lardner

[57] ABSTRACT

A power sunroof for a motor vehicle is disclosed, which comprises a structure for defining a sunroof opening in a roof of the vehicle; a lid sized to close the sunroof opening, the lid being provided around its periphery with a weather strip; a mechanism for permitting the lid to have a tilt-up position, a full-close position, a flap-down position and a full-open position, the tilt-up position being a position wherein the lid is tilted up with respect to the sunroof opening, the full-close position being a position wherein the lid is received in the sunroof opening with the weather strip compressed therebetween, the flap-down position being a position wherein the lid is tilted down with respect to the sunroof opening, and the full-open position being a position wherein the lid gets under the roof fully opening the sunroof opening; an electric drive motor for driving, when energized, the lid to assume the tilt-up, full-close, flap-down and full-open positions by using an electric power; and a controller for controlling the electric drive motor in such a manner that the full-close position of the lid is always achieved by pivoting the lid upward from the flap-down position.

11 Claims, 13 Drawing Sheets

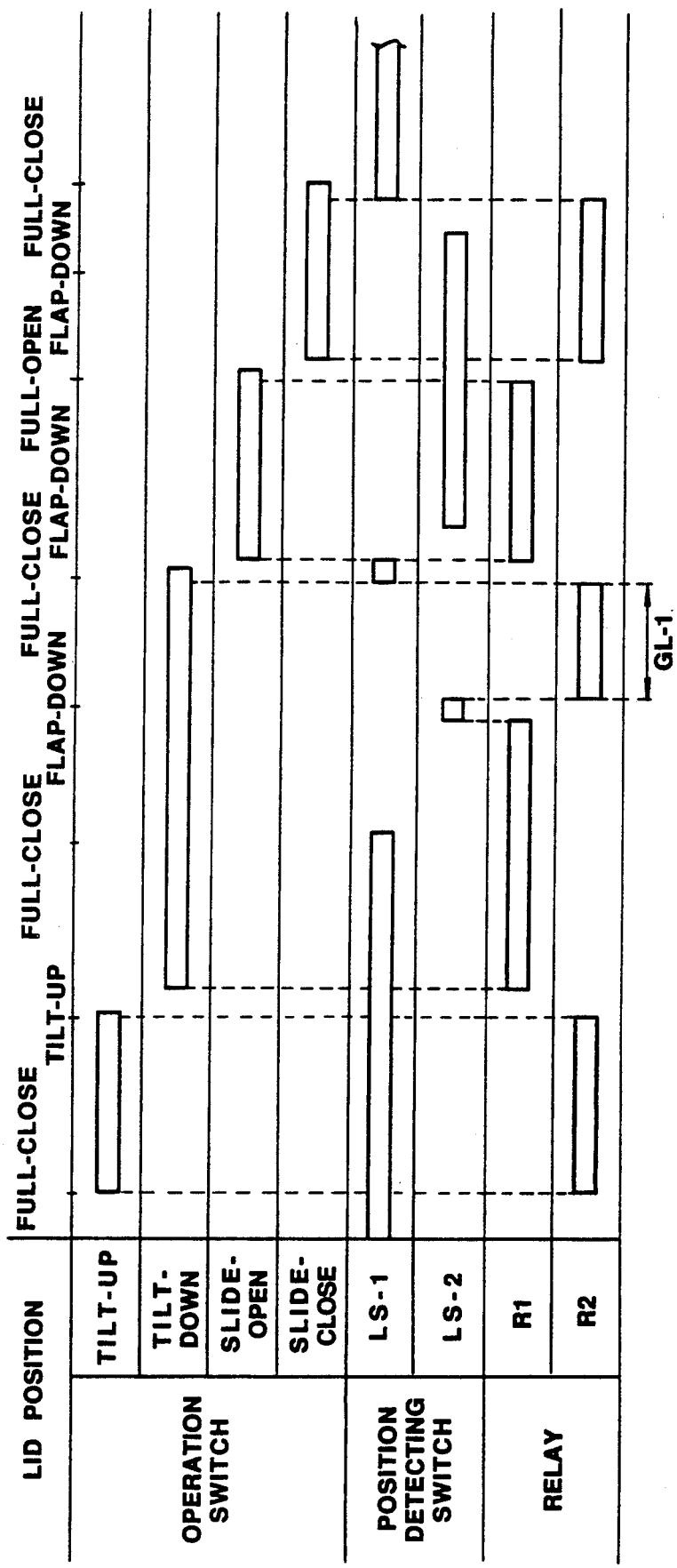

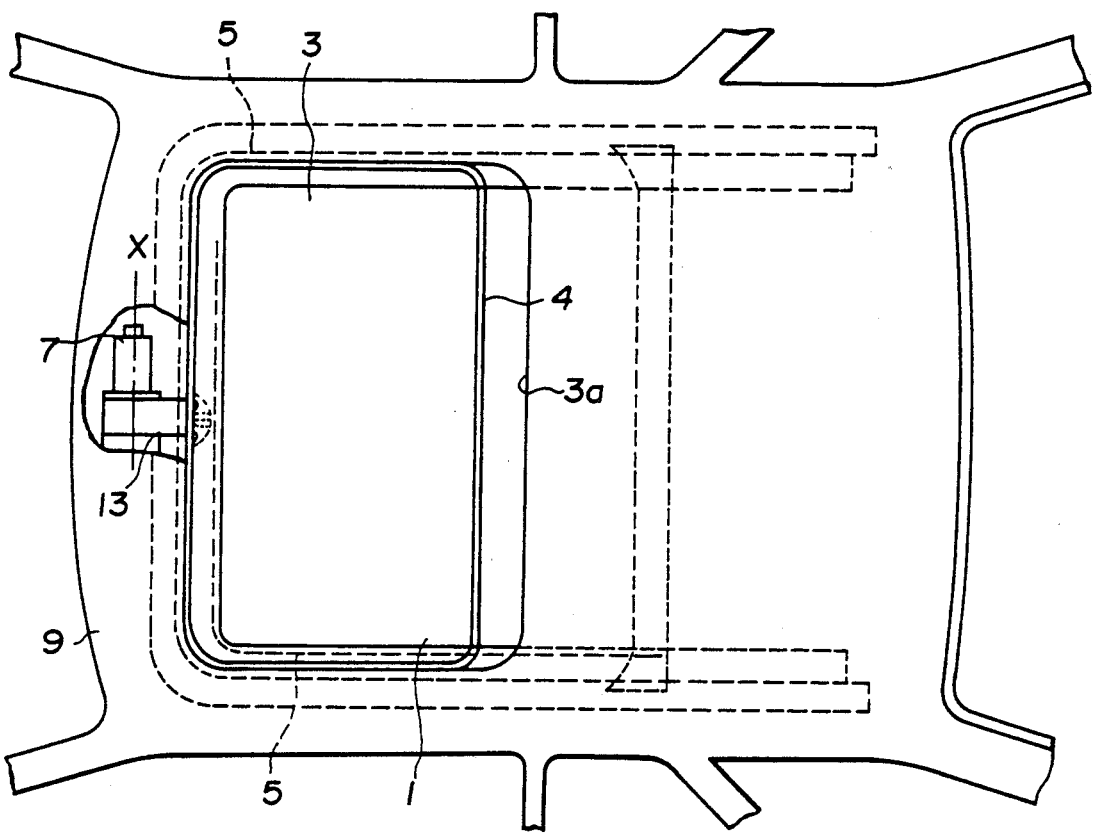
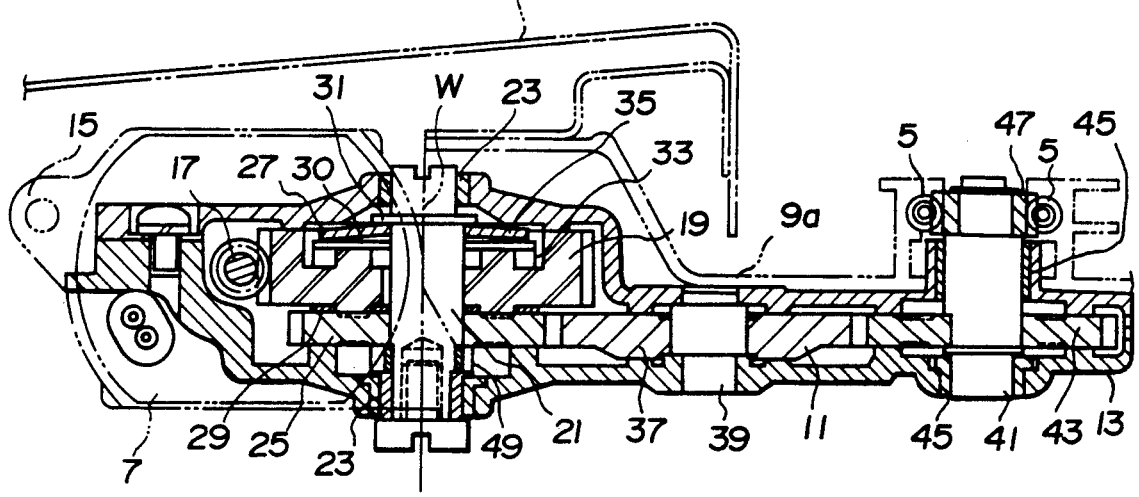

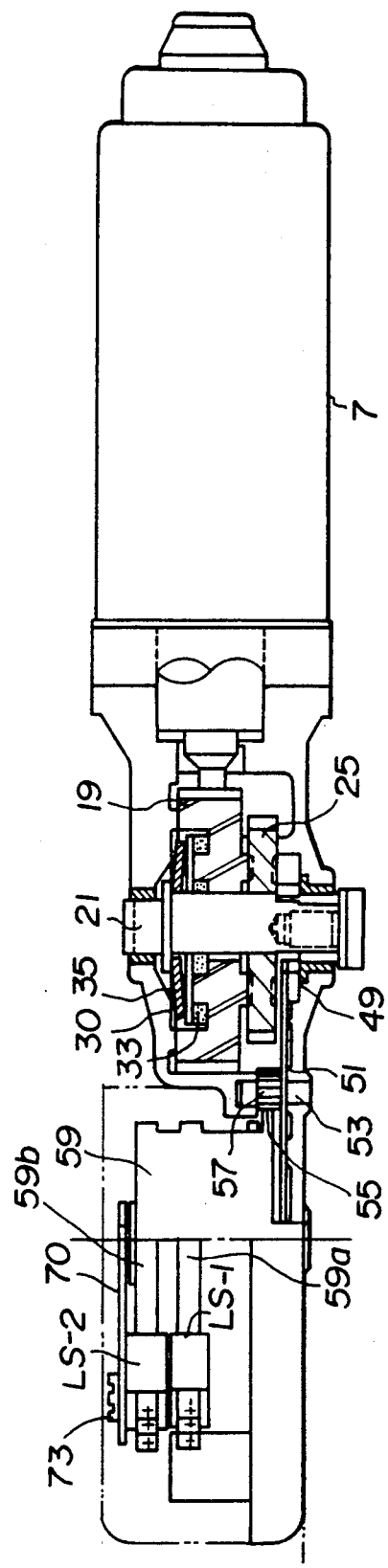

– continued –

AUTOMOTIVE POWER SUNROOF

BACKGROUND OF THE INVENTION

1. Field of the Invention

The present invention relates in general to power sunroofs for automobiles and more particularly to automotive power sunroofs of a type which uses an electric motor as a power device. More specifically, the present invention is concerned with automotive power sunroofs of a type in which a lid of the sunroof pivots between a tilt-up position and a tilt-down position.

2. Description of the Prior Art

In order to clarify the task of the present invention, one conventional power sunroof will be described with reference to FIGS. 14 to 17 of the accompanying drawings.

The power sunroof shown in the drawings is of a type having a tilting mechanism powered by an electric motor (not shown). That is, due to operation of the electric motor, a lid 101 of the sunroof is pivoted between a tilt-up position as shown in FIG. 15 wherein the lid 101 is tilted up about its front end and a full-close position as shown in FIG. 16 wherein the lid 101 fully closes a sunroof opening 105 which is defined by a roof panel 109 of a motor vehicle. The lid 101 is provided around its periphery with a weather strip 103 for achieving watertight sealing of the lid 101 against the sunroof opening 105 when the lid 101 assumes the full-close position.

When the lid 101 is pivoted down from the tilt-up position to the full-close position pressing the weather strip 103 against a peripheral edge 107 of the sunroof opening 105, the weather strip 103 is largely deformed by the peripheral edge 107.

However, as is seen from FIG. 14, the large deformation of the weather strip 103 causes a lip portion thereof unsightly projected to the outside of the roof panel 109. This phenomenon tends to prevent the lid 101 from taking the proper full-close position. Furthermore, this phenomenon lowers the external appearance of the vehicle because a considerable gap "d" is produced between the weather strip 103 and the roof panel 109.

One of measures for solving this drawback is disclosed in Japanese Patent First Provisional Publication No. 59-202934. In the measure, a cam mechanism is used by which, as is seen from FIG. 17, the lid 101 is tilted down beyond the full-close position to a so-called "flap-down" position and then tilted up to the full-close position.

However, this measure has other drawbacks. First, provision of the cam mechanism increases the number of parts used and thus the sunroof becomes complicated in construction and heavy in weight. Second, due to the nature of a cam member used in the mechanism, it is very difficult to obtain a smooth and effective pivotal movement of the lid 101.

SUMMARY OF THE INVENTION

It is therefore an object of the present invention to provide an automotive power sunroof which is free of the above-mentioned drawbacks.

According to the present invention, there is provided a power sunroof for a motor vehicle, which comprises first means for defining a sunroof opening in a roof of the vehicle; a lid sized to close the sunroof opening, the lid being provided around its periphery with a weather strip; second means for permitting the lid to have a tilt-up position, a full-close position, a flap-down position and a full-open position, the tilt-up position being a position wherein the lid is tilted up with respect to the sunroof opening, the full-close position being a position wherein the lid is received in the sunroof opening with the weather strip compressed therebetween, the flap-down position being a position wherein the lid is tilted down with respect to the sunroof opening, and the full-open position being a position wherein the lid gets under the roof fully opening the sunroof opening; an electric drive motor for driving, when energized, the lid to assume the tilt-up, full-close, flap-down and full-open positions by using an electric power; and third means for controlling the electric drive motor in such a manner that the full-close position of the lid is always achieved by pivoting the lid upward from the flap-down position.

BRIEF DESCRIPTION OF THE DRAWINGS

Other objects and advantages of the present invention will become apparent from the following description when taken in conjunction with the accompanying drawings, in which:

FIG. 2 is a timing-chart showing the operation timing of various electric devices employed in the first embodiment;

FIG. 3 is a plan but partial view of a motor vehicle to which the power sunroof of the present invention is applied, showing a lid in a tilt-up position;

FIG. 5 is a sectional view taken along the line V—V of FIG. 4;

FIG. 6 is a sectional view taken along the line VI—VI of FIG. 4;

DETAILED DESCRIPTION OF THE INVENTION

Figure 1:
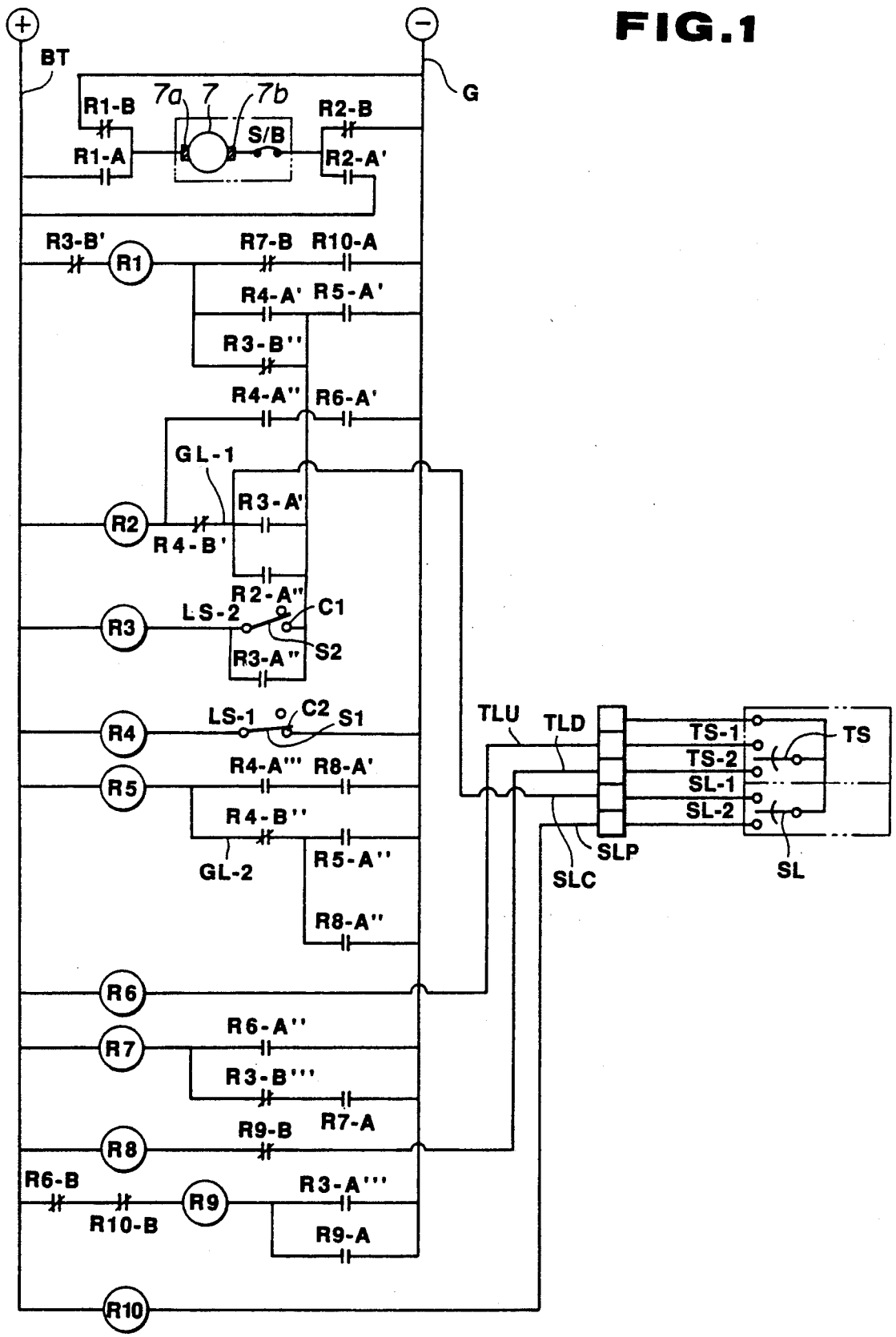
FIG. 1 is a control circuit employed in a power sunroof of a first embodiment of the present invention.

Referring to FIGS. 1 to 7 of the drawings, there is shown a power sunroof of a first embodiment of the present invention.

In FIG. 3, designated by numeral 1 is a lid which is associated with a sunroof opening 3 of a roof panel 9 of a motor vehicle. A peripheral edge of the sunroof opening 3 is denoted by numeral 3a. The lid 1 is provided around its periphery with a weather strip 4, so that when the lid 1 assumes its full-close position, the weather strip 4 abuts tightly against the peripheral edge 3a of the sunroof opening 3 to achieve watertight sealing therebetween.

A pair of geared cables 5 and 5 have respective portions secured to laterally opposed sides of the lid 1. Inwardly turned front portions of the geared cables 5 and 5 are engaged with diametrically opposed gears of a pinion gear 47 (see FIG. 5) which is driven by an electric drive motor 7. The drive motor 7 is of a reversible type which can change its rotation direction upon manipulation of a tilt operation switch "TS" (see FIG. 1) and a slide operation switch "SL" as will become apparent as the description proceeds.

As is understood from FIG. 3, the drive motor 7 is mounted beneath the roof panel 9 near a windscreen upper frame, in such a manner that the axis "X" of the motor 7 extends in the direction of the width of the motor vehicle.

As is seen from FIG. 3, the drive motor 7 is secured through bolts 16 to a flange 15 of a case 13 which houses therein after-mentioned first and second gear trains 11 and 12. An output shaft of the drive motor 7 is equipped with a worm 17 to which a worm wheel 19 is operatively meshed. In the illustrated embodiment, the axis of the worm wheel 19 is perpendicular to the axis "X" of the output shaft of the motor 7.

For ease of understanding, the worm wheel 19 will be named as "a first gear" hereinafter.

The first gear 19 is rotatably disposed about a shaft 21. As is seen from FIG. 5, the shaft 21 is supported by the case 13 through two axially spaced bearings 23 and 23. The shaft 21 is formed with an annular flange 31 near one bearing 23 and slidable in the direction of its axis "W". Axially opposed ends of the shaft 21 are exposed to the outside of the case 13.

A second gear 25 which is smaller than the first gear 19 is integrally and coaxially mounted on the shaft 21 to rotate therewith.

A friction clutch 27 is employed for connecting and disconnecting the first and second gears 19 and 25. That is, when, for some reason, the second gear 25 is applied with an abnormal load, the friction clutch 27 permits the first gear 19 to make idle rotation relative to the second gear 25. With this, the drive motor 7 is protected from over loading.

That is, as is seen from FIGS. 5 and 6, between the first and second gears 19 and 25, there is disposed a washer 29 which is secured to the first gear 19. Between the first gear 19 and the annular flange 31 of the shaft 21, there are disposed an annular clutch member 33, a washer 30 and a disc spring 35 in this order. The disc spring 35 is compressed to bias the first gear 19 toward the second gear 25 to produce a considerable friction therebetween.

With provision of this friction clutch 27, the connection of the first gear 19 to the second gear 25 becomes disengaged when the lid 1 is brought to the full-open position or the tilt-up position.

A third gear 37 is operatively engaged with the second gear 25, which constitutes the first gear train 11. The third gear 37 is rotatably disposed about a shaft 39 which has both ends fixed to the case 13. The third gear 37 is operatively engaged with a fourth gear 43 which is integrally and coaxially disposed on a shaft 41 to rotate therewith. The shaft 41 is rotatably supported by the case 13 through two spaced bearings 45 and 45.

As is understood from FIG. 5, the shape of the case 13 (more specifically, the arrangement of the first, second, third and fourth gears 19, 25, 37 and 43) is so made as not to affect the shape of a rainwater gutter 9a which extends laterally below a front edge portion of the sunroof opening 3.

The upper end of the shaft 41 of the fourth gear 43 is projected and has the pinion gear 47 secured thereto. For ease of understanding, the pinion gear 47 will be named as "fifth gear". As shown in FIG. 5, the fifth gear 47 has diametrically opposed portions respectively engaged with the geared cables 5 and 5. Thus, when, due to operation of the drive motor 7, the fifth gear 47 is rotated in one or the other direction, the lid 1 is moved between the afore-mentioned tilt-up position and the full-open position.

It is thus to be noted that the position of the lid 1 has a direct connection with a turning angle of the shaft 41, that is, the turning angle of the shaft 21.

The mechanism for effecting the tilt-up operation of the lid 1 is shown in U.S. Pat. No. 4,923,246 granted to Jun TAKAHASHI et al on May 8, 1990.

As is best seen in FIG. 6, the shaft 21 for the first and second gears 19 and 25 has further a sixth gear 49 which constitutes a part of the above-mentioned second gear train 12. The sixth gear 49 is coaxially and securedly connected to the shaft 21 to rotate therewith. The sixth gear 49 is meshed with a seventh gear 51 which is integrally disposed on a shaft 53 whose axial ends are rotatably held by the case 13. The shaft 53 is integrally formed with an eighth gear 57 to which a ninth gear 55 is meshed. The ninth gear 55 is integrally formed about a rotor 59 whose rotation shaft 61 (see FIG. 4) is rotatably held at its axially both ends by the case 13.

The rotor 59 has about its cylindrical outer surface two parallel tracks 59a and 59b. Each track 59a or 59b includes raised parts and depressed parts. Incorporated with these two tracks 59a and 59b are a full-close detecting switch LS-1 and a flap-down detecting switch LS-2. Each switch LS-1 or LS-2 has an outwardly biased button S1 or S2 which is pressed against the corresponding truck 59a or 59b. Thus, under rotation of the rotor 59, the button is axially moved in accordance with the shape of the corresponding truck 59a or 59b causing ON and OFF conditions of the corresponding switch LS-1 or LS-2.

Figure 18:
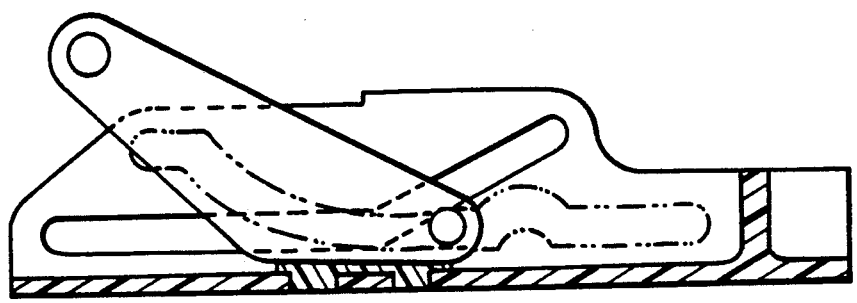
FIG. 18 is a schematic sectional view of the conventional power sunroof mechanism allowing the tilt-up, full-close, flap-down, and full-open positions.

It is to be noted that the full-close detecting switch LS-1 detects a condition wherein the lid 1 assumes the full-close position, and the flap-down detecting switch LS-2 detects a condition wherein the lid 1 assumes the flap-down position which is illustrated in FIG. 18.

The ON and OFF conditions of these switches LS-1 and LS-2 are depicted by the timing-chart of FIG. 2. That is, the ON condition of the full-close detecting switch LS-1 takes place when the lid 1 is pivoted up to the full-close position from the flap-down position or when the lid 1 is moved from the full-close position, which takes place just after the flap-down of the same, tilted up and tilted down to the full-close position. While, the ON condition of the flap-down detecting switch LS-2 takes place when the lid 1 is tilted down to the flap-down position from the full-close position or when the lid 1 is moved from the full-close position, which takes place just after the flap-down of the same, through the full-open position to the flap-down position.

These position detections of the switches LS-1 and LS-2 are possible because of the direct connection between the turning angle of the rotor 59 and that of the shaft 21.

Figure 4:
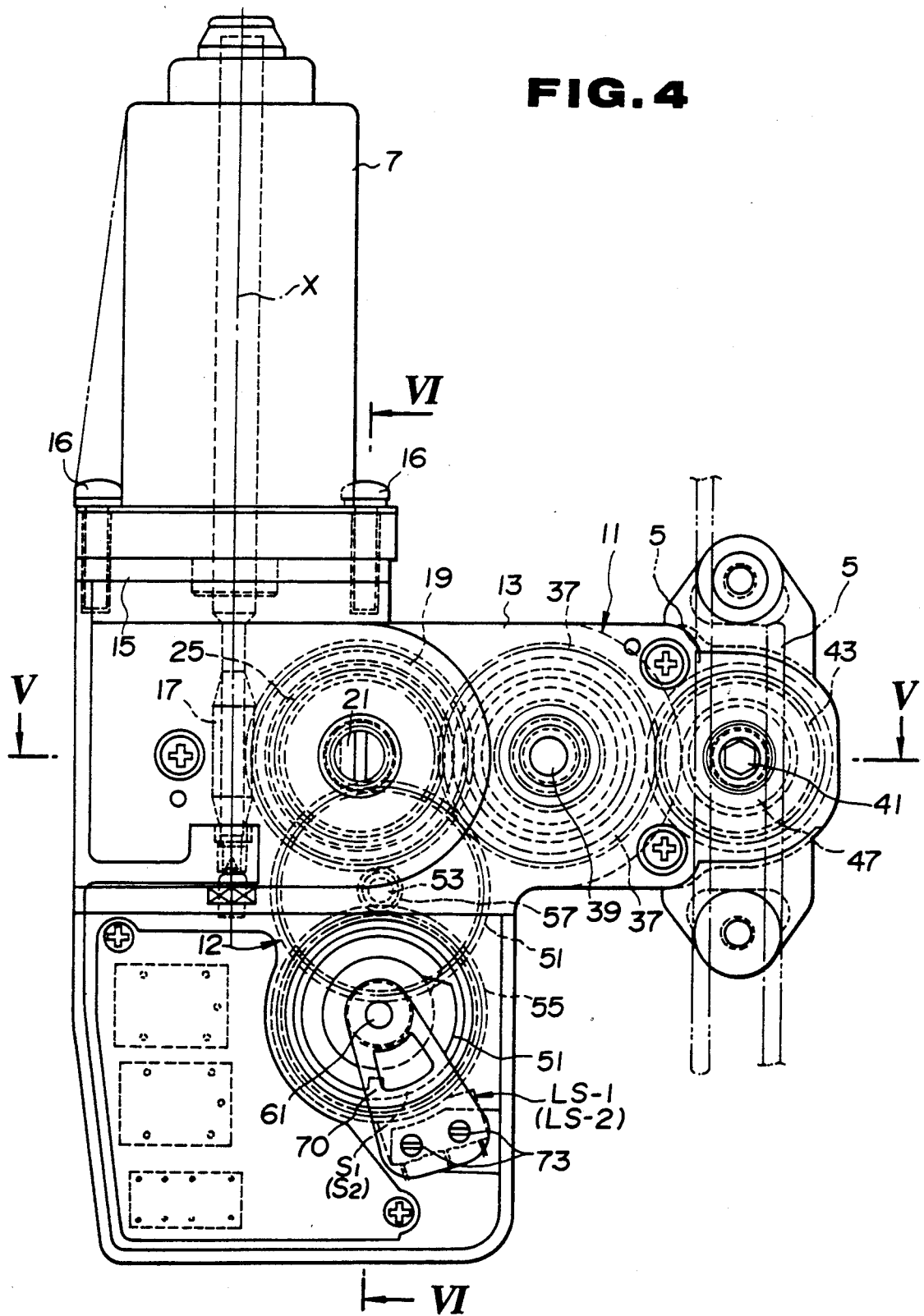
FIG. 4 is a plan view of a drive unit employed in the first embodiment.

As is seen from FIGS. 4 and 6, the two switches LS-1 and LS-2 have a pair of aligned bores through which respective bolts 73 pass. Each bolt 73 has a threaded end tightly screwed into a solid part of the case 13. With this, the switches LS-1 and LS-2 are tightly fixed to the case 13. A bracket 70 is secured to the flap-down detecting switch LS-2 via the bolts 73, which extends toward the rotation shaft 61 of the rotor 59 to rotatably support the same.

Referring to FIG. 1, there is shown a control circuit for controlling the operation of the drive motor 7. In the circuit, denoted by references R1 and R2 are motor relay coils, and denoted by reference R3, R4, R5, R6, R7, R8, R9 and R10 are relay coils.

The motor relay coil R1 includes a normally open contact R1-A and a normally closed contact R1-B. One end of the motor relay coil R1 is connected through a relay contact R3-B' to a positive bus line BT connected to a positive electrode of a battery, while the other end of the coil R1 is connected to a negative bus line G through relay contacts R7-B and R10-A which are connected in series. The negative bus line G is connected to a negative electrode of the battery. The coil R1 is energized when electric current passes therethrough. That is, upon energization of the coil R1, the normally open contact R1-A becomes closed and the normally closed contact R1-B becomes open.

The contacts R1-A and R1-B are connected in series at their one ends through a line which is connected to a first terminal 7a of the drive motor 7. The other end of the contact R1-A is connected to the positive bus line BT, and the other end of the contact R1-B is connected to the negative bus line G.

The motor relay coil R2 includes two normally open contacts R2-A' and R2-A" and a normally closed contact R2-B. One end of the motor coil R2 is connected to the positive bus line BT, and the other end of the motor coil R2 is connected to the negative bus line G through relay contacts R4-A" and R6-A' which are connected in series. The other end of the coil R2 is further connected to a relay contact R4-B'. The coil R2 is energized when electric current passes therethrough. That is, upon energization of the coil R2, the normally open contacts R2-A' and R2-A" become closed and the normally closed contact R2-B becomes open.

The normally closed contact R2-B of the motor coil R2 and the first normally open contacts R2-A' are connected in series at their one ends through a line which is connected to a second terminal 7b of the drive motor 7. The other end of the contact R2-A' is connected to the positive bus line BT and the other end of the contact R2-B is connected to the negative bus line G.

Accordingly, when the contacts R1-A and R1-B and the contacts R2-A' and R2-B change their modes from close position to open position or from open position to close position, the current flow through the drive motor 7 is made in a direction from the first terminal 7a to the second terminal 7b or from the second terminal 7b to the first terminal 7a, causing the drive motor 7 to run in a normal direction or a reversed direction.

The second normally open contact R2-A" of the motor coil R2 is connected in parallel with the contact R3-A'. One end of the contact R2-A" is connected to the coil motor R2 through the contact R4-B' and connected to a slide-close control circuit "SLC". The other end of the contact R2-A" is connected through a relay contact R5-A' to the negative bus line G.

As is seen from the timing-chart of FIG. 2, from the time at which the lid 1 is tilted down from the full close position to the flap-down position to the time at which the lid 1 is tilted up from the flap-down position to the full close position, the motor relay R2 is kept energized. Thus, during such period, the second normally open contact R2-A" of the motor coil R2 is kept closed permitting formation of a holding circuit GL-1 even when the circuit including the contacts R4-A" and R6-A' is not completed.

The relay coil R3 includes three normally open contacts R3-A', R3-A" and R3-A"' and three normally closed contacts R3-B', R3-B" and R3-B"'. One end of the relay coil R3 is connected to the positive bus line BT, and the other end of the relay coil R3 is connected to a switching terminal S2 of the flap-down detecting switch LS-2. One contact C1 of the flap-down detecting switch LS-2 is connected through the relay contact R5-A' to the negative bus line G. The relay coil R3 becomes energized when electric current passes therethrough. Upon energization of the relay coil R3, the contacts R3-A', R3-A" and R3-A"' become closed and the other contacts R3-B', R3-B" and R3-B"' become open.

The first normally closed contact R3-B' is interposed between the positive bus line BT and the motor relay coil R1. The second normally closed contact R3-B" is connected in parallel with the relay contact R4-A' and connected in series with the relay contact R5-A'. The third normally closed contact R3-B"' is connected in parallel with a relay contact R6-A"' and connected in series with the relay coil R7 which is connected to the positive bus line BT. The third contact R3-B"' is connected to the negative bus line G through a relay contact R7-A.

The first normally open contact R3-A' has one end connected to both the relay contact R4-B' and the slide-close control circuit "SLC" and has the other end connected through the relay contact R5-A' to the negative bus line G. The second normally open contact R3-A" is connected in parallel with the flap-down detecting switch LS-2. The third normally open contact R3-A"' is connected in parallel with a relay contact R9-A and has one end connected to a relay coil R9 and the other end connected to the negative bus line G.

The relay coil R4 includes three normally open contacts R4-A', R4-A" and R4-A"' and two normally closed contacts R4-B' and R4-B". One end of the relay coil R4 is connected to the positive bus line BT, and the other end of the relay coil R4 is connected to the negative bus line G through the full-close detecting switch LS-1. Upon energization of the relay coil R4, the normally open contacts R4-A', R4-A" and R4-A"' become closed and the normally closed contacts R4-B' and R4-B" become open.

The first normally open contact R4-A' has one end connected to the motor relay coil R1 and the other end connected to the relay contact R5-A'. The second normally open contact R4-A" has one end connected to the motor relay coil R2 and the other end connected to the negative bus line G through the relay contact R6-A'. The third normally open contact R4-A"' has one end connected to the relay coil R5 and the other end connected to the negative bus line G through the relay contact R8-A'.

The first normally closed contact R4-B' has one end connected to the motor relay coil R2 and the other end connected to the relay contact R3-A'. The second normally closed contact R4-B" has one end connected to the relay coil R5 and the other end connected to the negative bus line G through the parallely arranged relay contact R5-A" and relay contact R8-A".

Accordingly, the relay coil R5 is provided with two circuits, one being a circuit including the normally open contacts R4-A''' and R8-A', and the other being a circuit including the normally closed contact R4-B", the normally open contact R5-A" and the normally open contact R8-A". That is, when one of these circuits is made OFF, the other circuit becomes ON allowing formation of a holding circuit GL-2.

The relay coil R5 includes two normally open contacts R5-A' and R5-A" which are arranged in the circuit in the illustrated manner.

The relay coil R6 includes two normally open contacts R6-A' and R6-A" and a normally closed contact R6-B. One end of the relay coil R6 is connected to the positive bus line BT and the other end of the same is connected to a tilt-up control circuit "TLU". Upon energization of the relay coil R6, the normally open contacts R6-A' and R6-A" become closed and the normally closed contact R6-B becomes open. The first normally open contact R6-A' has one end connected to the relay contact R4-A" and the other end connected to the negative bus line G. The second normally open contact R6-A" has one end connected to the relay coil R7 and the other end connected to the negative bus line G. The normally closed contact R6-B has one end connected to the positive bus line BT and the other end connected to the relay contact R10-B.

The relay coil R7 includes a normally open contact R7-A and a normally closed contact R7-B. One end of the relay coil R7 is connected to the positive bus line BT and the other end of the same is connected to the relay contact R6-A. Thus, upon energization of the relay coil R7, the normally open contact R7-A and the normally closed contact R7-B become closed and open respectively. The normally closed contact R7-B has one end connected to the relay coil R1 and the other end connected through the relay contact R10-A to the negative bus line G. The normally open contact R7-A has one end connected to the relay contact R3-B''' and the other end connected to the negative bus line G.

The relay coil R8 includes two normally open contacts R8-A' and R8-A". One end of the relay coil R8 is connected to the positive bus line BT and the other end of the same is connected through the relay contact R9-B to a tilt-down control circuit "TLD". Upon energization of the relay coil R8, the normally open contacts R8-A' and R8-A" become closed. The first normally open contact R8-A' has one end connected to the relay contact R4-A''' and the other end connected to the negative bus line G. The second normally open contact R8-A" has one end connected to both the relay contacts R5-A" and R4-B" and the other end connected to the negative bus line G.

The relay coil R9 includes a normally open contact R9-A and a normally closed contact R9-B. One end of the relay coil R9 is connected through the relay contacts R10-B and R6-B to the positive bus line BT and the other end of the same is connected to the negative bus line G through the parallelly connected relay contacts R3-A''' and R9-A. Upon energization of the relay coil R9, the normally open contact R9-A and the normally closed contact R9-B become closed and open respectively. The normally open contact R9-A is connected in parallel with the relay contact R3-A''' and has one end connected to the relay coil R9 and the other end connected to the negative bus line G. The normally closed contact R9-B has one end connected to the relay coil R8 and the other end connected to the tilt-down control circuit "TLD".

The relay coil R10 includes a normally open contact R10-A and a normally closed contact R10-B. The relay coil R10 has one end connected to the positive bus line BT and the other end connected to a slide-open control circuit "SLP". Upon energization of the relay coil R10, the normally open contact R10-A and the normally closed contact R10-B become closed and open respectively. One end of the normally open contact R10-A is connected to the relay contact R7-B and the other end of the same is connected to the negative bus line G. One end of the normally closed contact R10-B is connected to the relay contact R6-B and the other end of the same is connected to the relay coil R9.

A first switch contact TS-1 of the tilt-up control circuit TLU and a second switch contact TS-2 of the tilt-down control circuit TLD are controlled in ON-OFF manner by the tilt-operation switch TS.

A slide close contact SL-1 of the slide close control circuit SLC and a slide open contact SL-2 of the slide open control circuit SLP are controlled in ON-OFF manner by the slide operation switch SL.

In the following, operation of the power sunroof of the first embodiment will be described with respect to FIGS. 1 and 2.

For ease of understanding, the description will be commenced with respect to a condition wherein the lid 1 assumes the full-close position.

When, by manipulating the tilt-operation switch TS, the first switch contact TS-1 is closed, the relay coil R6 is energized. At the same time, due to work of the full-close detecting switch LS-1, the relay coil R4 is energized.

With this, the motor relay coil R2 becomes energized causing the drive motor 7 to be energized by an electric current which flows therethrough from the second terminal 7b toward the first terminal 7a. Thus, the drive motor 7 is forced to run in a normal direction and thus the lid 1 is forced to pivot upward toward the tilt-up position.

When the lid 1 reaches the tilt-up position, the tilt-operation switch TS is manipulated to assume a neutral position. With this, the drive motor 7 becomes deenergized and thus the lid 1 keeps the tilt-up position.

When, thereafter, by manipulating the tilt-operation switch TS, the second switch contact TS-2 is closed, the relay coils R8 and R5 are energized. Thus, upon this, the motor relay coil R1 becomes energized causing the drive motor 7 to be energized by an electric current which flows therethrough from the first terminal 7a toward the second terminal 7b. Thus, the drive motor 7 is forced to run in a reversed direction and thus the lid 1 is forced to pivot downward from the tilt-up position.

When the lid 1 comes to the full-close position, the full-close detecting switch LS-1 becomes OFF causing deenergization of the relay coil R4. However, under this condition, the relay coil R5 is kept energized due to the work of the holding circuit GL-2 and thus the running of the drive motor 7 in the reversed direction is maintained causing the continuous downward pivoting of the lid 1.

When the lid 1 comes to the flap-down position, the flap-down detecting switch LS-2 is closed thereby energizing the relay coil R3. Upon this, the motor coil R1 becomes deenergized and the other motor coil R2 becomes energized and thus the drive motor 7 is forced to run in the normal direction pivoting the lid 1 upward to the full-close position.

When the lid 1 reaches the full-close position, the tilt operation switch TS is manipulated to assume the neutral position. With this, the drive motor 7 becomes deenergized and thus the lid 1 keeps the full-close position.

Figure 8:
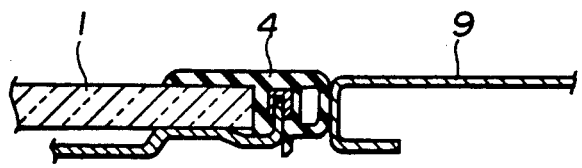
FIG. 8 is a sectional but partial view of the power sunroof, showing a sunroof lid in a full-close position.

As is understood from FIG. 8, because the full-close condition of the lid 1 is achieved by pivoting the lid 1 upwardly from the flap-down position, the weather strip 4 of the lid 1 is prevented from forming an unsightly lip which is projected outwardly beyond the roof panel 9.

When, under this full-close condition, it is required to open the lid 1, the slide operation switch SL is manipulated to close the slide open contact SL-2 of the slide open control circuit SLP. With this, the relay coil R10 becomes energized to energize the motor relay coil R1. Thus, the drive motor 7 is forced to run in the reversed direction causing the lid 1 to pivot down to the flap-down position. When the slide open contact SL-2 is kept closed continuously by the slide operation switch SL, the lid 1 thus inclined somewhat is moved downward toward the full-open position.

Figure 7:
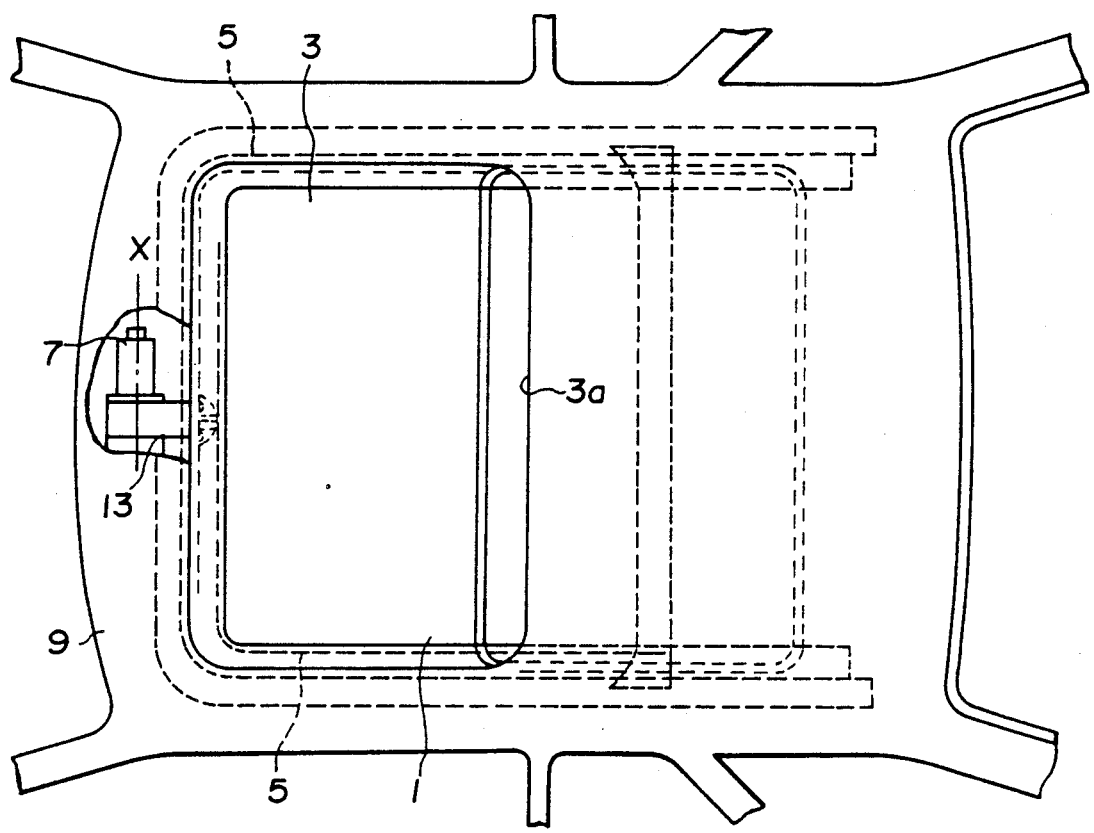
FIG. 7 is a view similar to FIG. 3, but showing the lid in a full-open position.

When the lid 1 comes to the full-open position as shown in FIG. 7, the slide operation switch SL is manipulated to assume a neutral position. With this, the drive motor 7 becomes deenergized and thus the lid 1 stays at the full-open position.

When now the slide operation switch SL is manipulated to close the slide close contact SL-1, the motor relay coil R2 is energized to cause the drive motor 7 to run in the normal direction. With this, the lid 1 is moved forward to the flap-down position and then pivoted up the full-close position. Upon this, the slide operation switch SL is manipulated to assume the neutral position. Thus, the drive motor 7 is deenergized and the lid 1 is kept at the full-close position.

It is to be noted that always the full-close position of the lid 1 is achieved by pivoting the lid 1 upwardly from the flap-down position. Thus, the full-close condition of the lid 1 is kept neatly without providing the weather strip 4 with the undesired outwardly projected lip.

Figure 9:
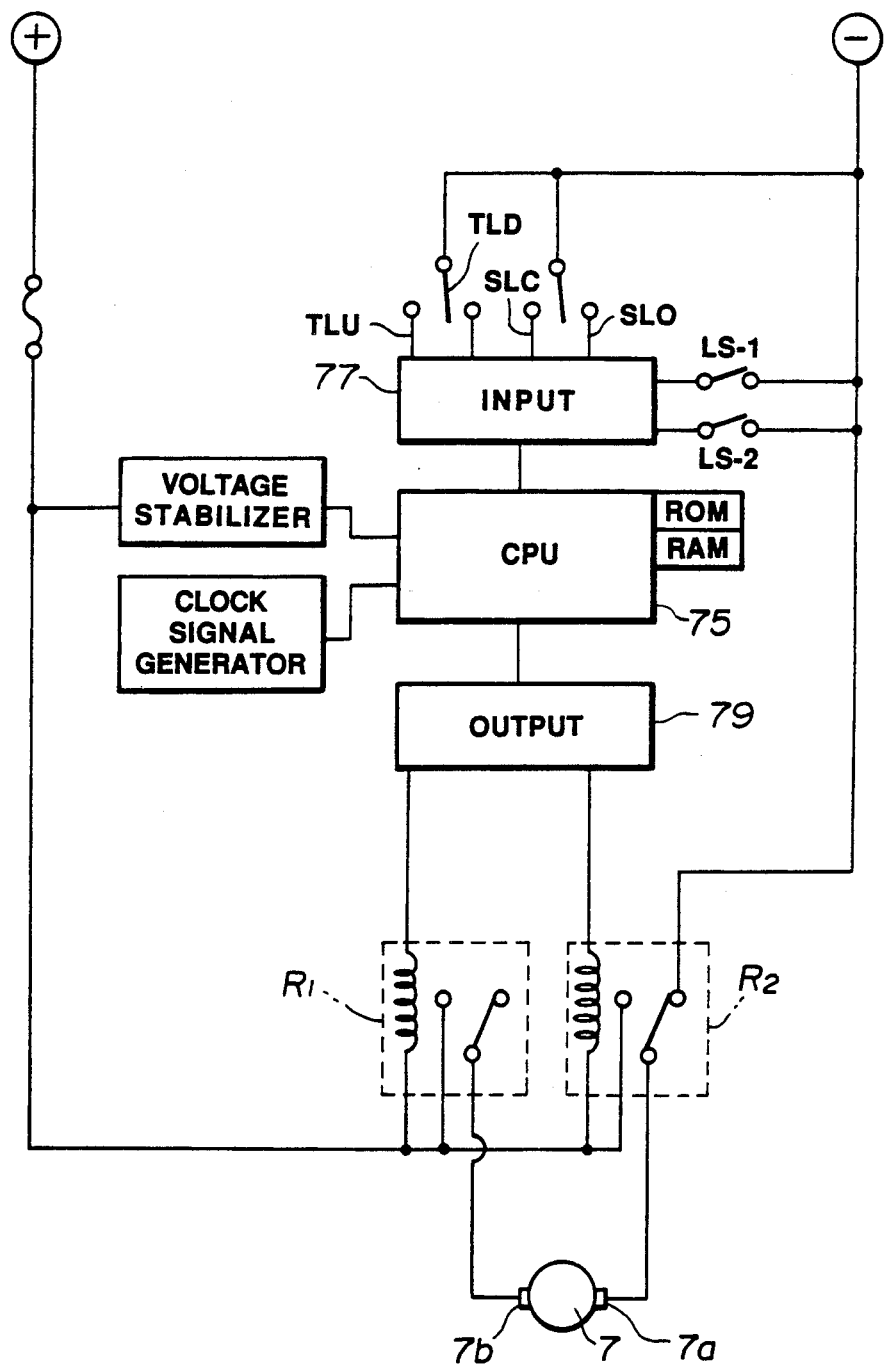
FIG. 9 is a block diagram of a control circuit which is used in a second embodiment of the present invention.

FIG. 9 shows a control circuit which is used in a second embodiment of the present invention. In this embodiment, a microcomputer is employed. That is, as is seen from the circuit, various information signals are fed through an input interface 77 to a central processing unit "CPU" 75, and the instruction signals produced by the CPU are fed to the drive motor 7 through an output interface 79.

That is, the signals from the full-close detecting switch LS-1, the flap-down detecting switch LS-2, the tilt-up control circuit TLU, the tilt-down control circuit TLD, the slide-open control circuit SLP and the slide-close control circuit SLC are fed through the input interface 77 to the CPU 75. The instruction signals produced by the CPU are fed through the output interface 79 to both the motor coils R1 and R2. With this, the above-mentioned advantageous movement of the lid 1 is achieved.

Referring to FIGS. 10 to 13, there is shown a third embodiment of the present invention.

Since the third embodiment is similar to the above-mentioned first embodiment, only the parts which are different from those of the first embodiment will be described.

Figure 12:
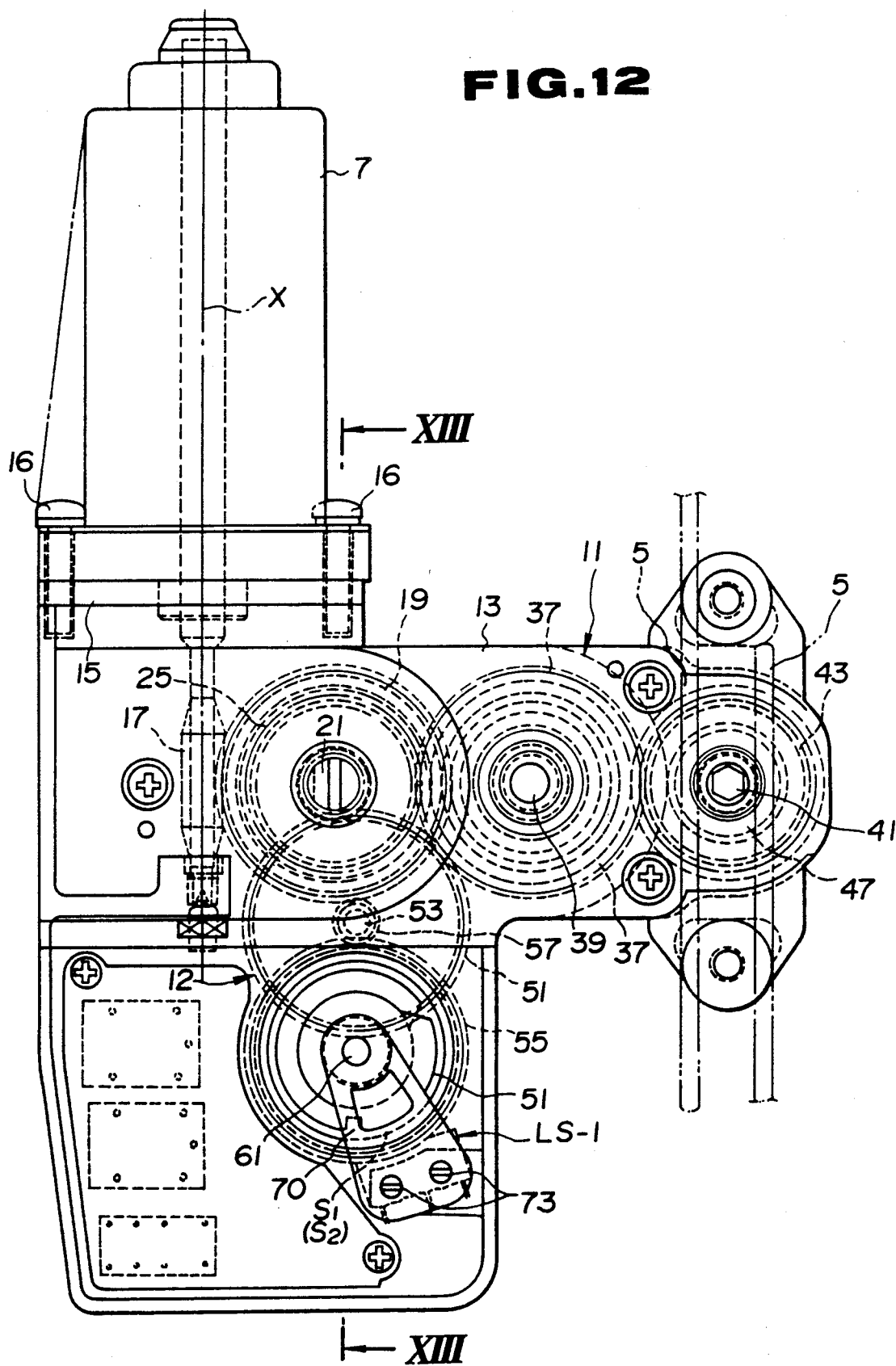
FIG. 12 is a plan view of a drive device employed in the third embodiment.
Figure 13:
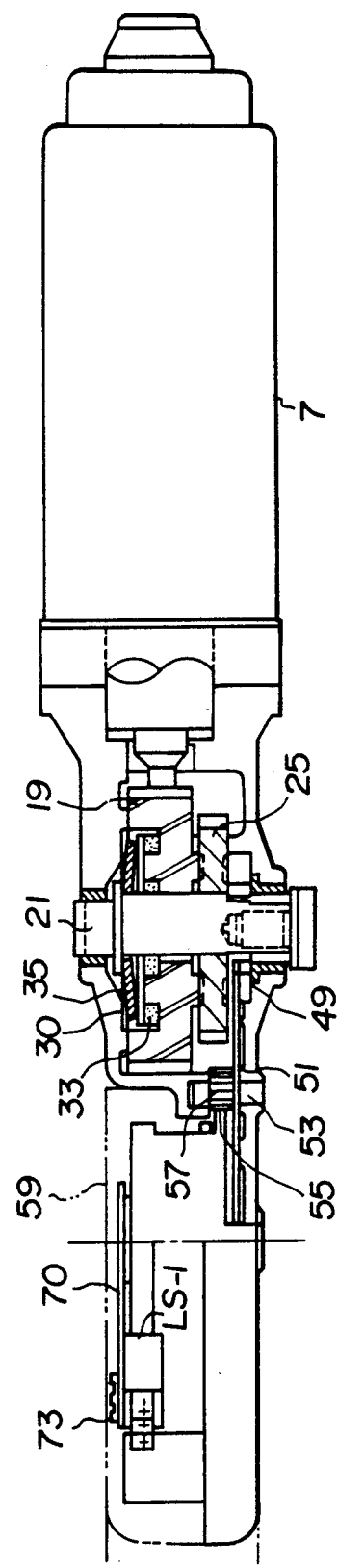
FIG. 13 is a sectional view taken along the line XIII—XIII of FIG. 12.
Figure 14:
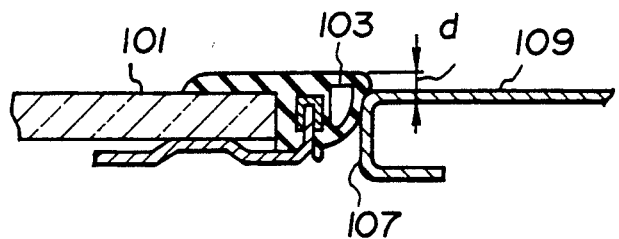
FIG. 14 is a view similar to FIG. 8, but showing a conventional power sunroof.
Figure 15:
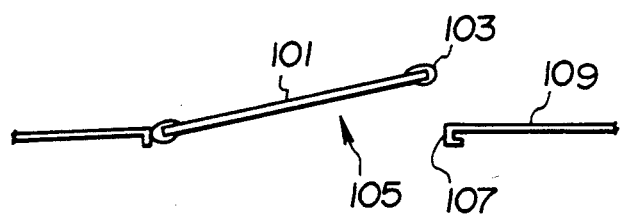
FIGS. 15, 16, and 17 are schematic sectional views of the conventional power sunroof, showing various positions of the lid.
Figure 16:
Figure 17:
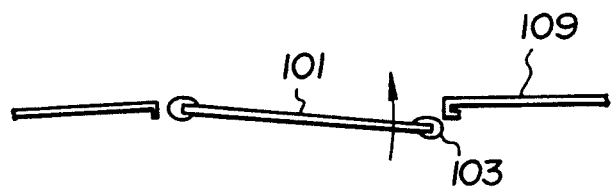

As is seen from FIGS. 12 and 13, in this third embodiment, around the rotor 59, there is arranged only the full-close detecting switch LS-1. The outwardly biased button of the switch LS-1 is designated by S1.

Figure 10:
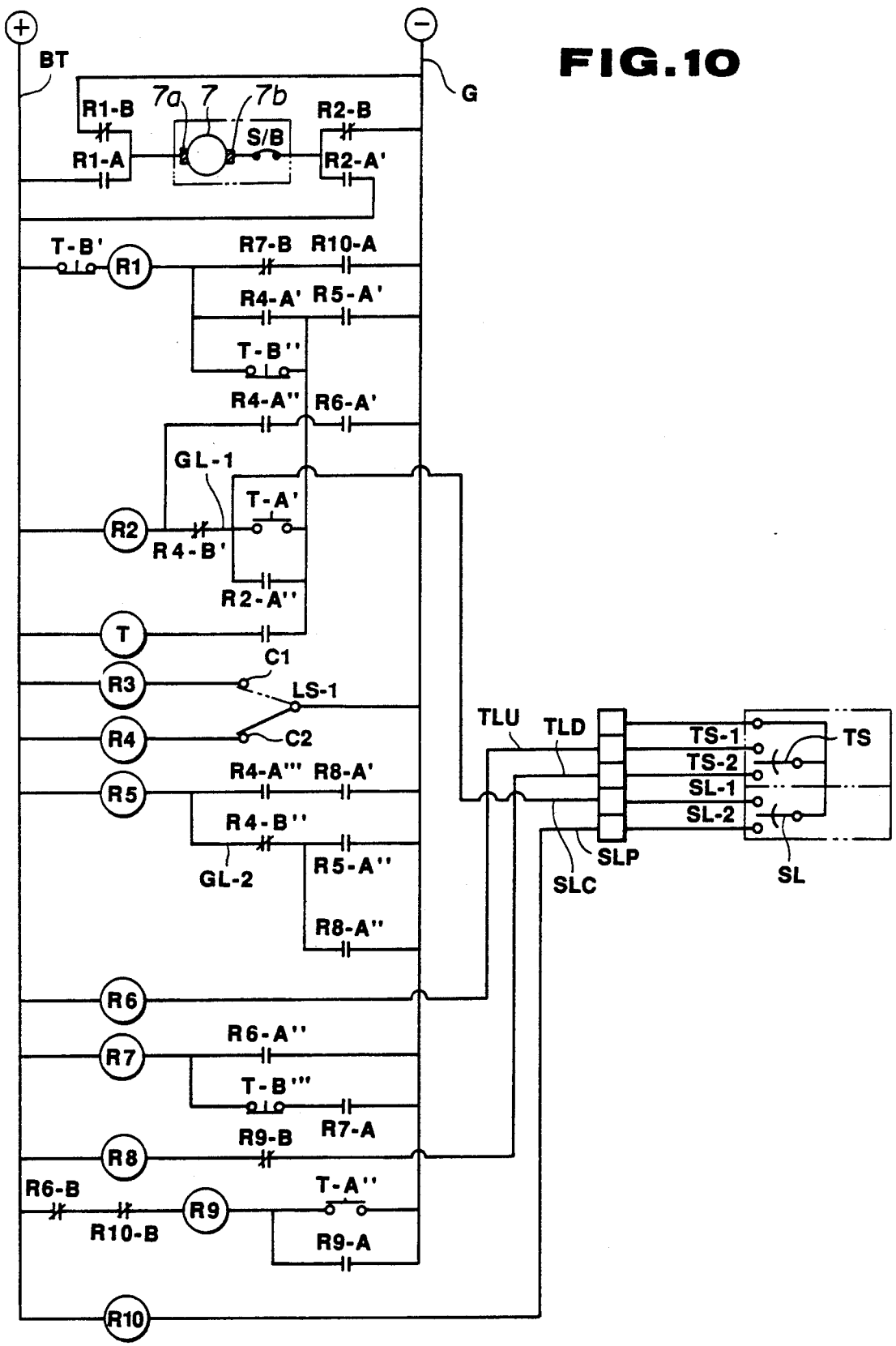
FIG. 10 is a control circuit employed in a power sunroof of a third embodiment of the present invention.
Figure 11:
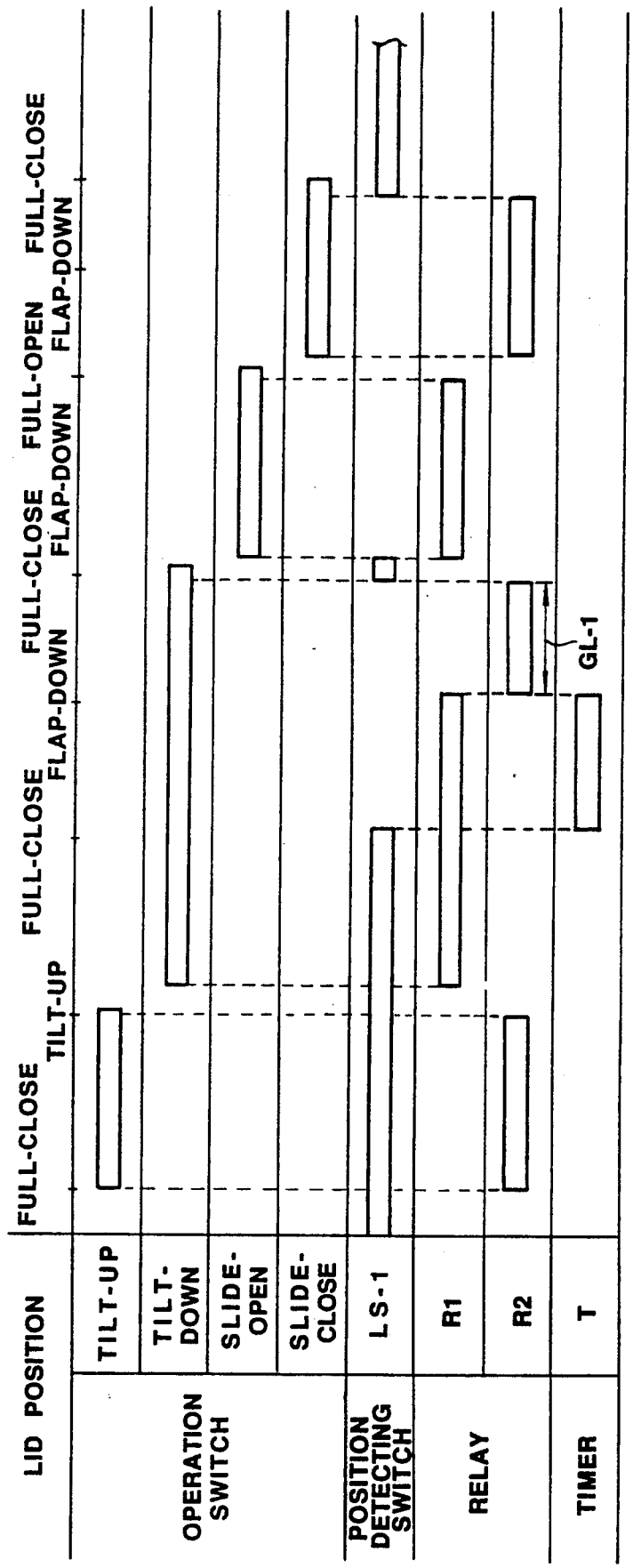
FIG. 11 is a time-chart showing the operation timing of various electric devices employed in the third embodiment.

As is understood from the timing-chart of FIG. 11, the ON condition of the full-close detecting switch LS-1 takes place when the lid 1 is pivoted up to the full-close position from the flap-down position or when the lid 1 is moved from the full-close position, which takes place just after the flap-down of the same, tilted up and tilted down to the full-close position. As is seen from FIG. 10, the switch LS-1 functions to selectively connect first and second contacts C1 and C2 of the relay coils R3 and R4 to the negative bus line G in accordance with the ON-OFF operation thereof.

As is seen from FIG. 12, the switch LS-1 has a pair of bores 73 through which respective bolts 73 pass. Each bolt 73 has a threaded end tightly screwed into a solid part of the case 13. With this, the switch LS-1 is tightly fixed to the case 13. A bracket 70 is fixed to the full-close detecting switch LS-1 via the bolts 73, which extends toward the rotation shaft 61 to rotatably support the same.

Referring to FIG. 10, there is shown a control circuit for controlling the operation of the drive motor 7 employed in the power sunroof of the third embodiment.

Since the control circuit of this third embodiment is similar to that of the afore-mentioned first embodiment, only parts which are different from those of the first embodiment will be described in the following.

In the circuit, denoted by "T" is a timer circuit.

The timer circuit "T" includes two timer-open contacts T-A' and T-A" and three timer-closed contacts T-B', T-B" and T-B'". The timer circuit "T" is kept OFF for a given time from the time when electrically energized, and turned ON upon expiration of the given time. That is, ON condition of the timer circuit "T" is achieved with a certain time lag. Under ON condition of the timer circuit "T", the timer-open contacts T-A' and T-A" are kept closed and the timer-closed contacts T-B', T-B" and T-B'" are kept open.

One end of the timer circuit "T" is connected to the positive bus line BT, and the other end of the same is connected to the negative bus line G through the relay contacts R3-A" and R5-A'.

The first timer-closed contact T-B' has one end connected to the positive bus line BT and the other end connected to the motor relay coil R1. Thus, the first timer-closed contact T-B' is used as a substitute for the first normally closed contact R3-B' of the relay coil R3 in the first embodiment.

The second timer-closed contact T-B" has one end connected to the motor relay coil R1 and the other end connected to the relay contact R5-A' of the relay coil R5. Thus, the second timer-closed contact T-B" is used as a substitute for the second normally closed contact R3-B" of the relay coil R3 in the first embodiment.

The third timer-closed contact T-B'" has one end connected to the relay coil R7 and the other end connected to the relay contact R7-A. Thus, the third timer-closed contact T-B'" is used as a substitute for the third normally closed contact R3-B''' of the relay coil R3 in the first embodiment.

The first timer-open contact T-A' is arranged in parallel with the second normally open contact R2-A'' of the relay coil R2. Thus, the contact T-A' is used as a substitute for the relay contact R3-A' of the relay coil R3 in the first embodiment.

The second timer-open contact T-A'' is arranged in parallel with the relay contact R9-A of the relay coil R9. Thus, the contact T-A'' is used as a substitute for the relay contact R3-A''' of the relay coil R3 in the first embodiment.

In the following, operation of the power sunroof of the third embodiment will be described with reference to FIGS. 10 and 11.

For ease of understanding, the description will be commenced with respect to a condition wherein the lid 1 assumes its full-close position.

When, by manipulating the tilt-operation switch TS, the first switch contact TS-1 is closed, the relay coil R6 is energized. At the same time, due to the work of the full-close detecting switch LS-1, the relay coil R4 is energized.

With this, the motor relay coil R2 becomes energized causing the drive motor 7 to be energized by an electric current which flows therethrough from the second terminal 7b toward the first terminal 7a. Thus, the drive motor 7 is forced to run in a normal direction and thus the lid 1 is forced to pivot upward toward the tilt-up position.

When the lid 1 reaches the tilt-up position, the tilt-operation switch TS is manipulated to assume a neutral position. With this, the drive motor 7 becomes deenergized and thus the lid 1 keeps the tilt-up position.

When, thereafter, by manipulating the tilt-operation switch TS, the second switch contact TS-2 is closed, the relay coils R8 and R5 are energized. Thus, upon this, the motor relay coil R1 is energized causing the drive motor 7 to be energized by an electric current which flows therethrough from the first terminal 7a toward the second terminal 7b. Thus, the drive motor 7 is forced to run in a reversed direction and thus the lid 1 is forced to pivot down from the tilt-up position.

When the lid 1 comes to the full-close position, the full-close detecting switch LS-1 breaks energization of the relay coil R4 and causes energization of the relay coil R3. Thus, upon this, the timer circuit T starts the time-counting.

However, under this condition, the relay coil R5 is kept energized due to the work of the holding circuit GL-2. Thus, the first timer-closed contact T-B' is kept closed and thus, the running of the drive motor 7 in the reversed direction is maintained permitting the continuous downward pivoting of the lid 1 toward the flap-down position.

When, with the lid 1 pivoting downward toward the flap-down position, the time determined by the timer circuit T passes, the timer-closed contact T-B' becomes open and the timer-open contact T-A' becomes closed, so that the motor relay coil R1 becomes OFF and the other motor relay coil R2 becomes ON. Accordingly, the drive motor 7 is forced to run in the normal direction pivoting the lid 1 upward toward the full-close position.

When the lid 1 reaches the full-close position, the full-close detecting switch LS-1 becomes ON and thus the drive motor 7 is deenergized and thus the lid 1 keeps the full-close position.

When, with the lid 1 assuming the full-close position, it is required to open the lid 1, the slide operation switch SL is manipulated to close the slide-open contact SL-2 of the slide open control circuit SLP. With this, the relay coil R10 becomes energized to energize the motor relay coil R1. Thus, the drive motor 7 is forced to run in the reversed direction causing the lid 1 to pivot down and move toward the full-open position.

When the lid 1 comes to the full-open position as shown in FIG. 7, the slide operation switch SL is manipulated to assume a neutral position. With this, the drive motor 7 becomes deenergized and thus the lid 1 stays at the full-open position.

When now the slide operation switch SL is manipulated to close the slide close contact SL-1, the motor relay coil R2 is energized to cause the drive motor 7 to run in the normal direction. With this, the lid 1 is moved forward to the full-close position through the so-called flap-down position. Upon this, the slide operation switch SL is manipulated to assume the neutral position. Thus, the drive motor 7 is deenergized and the lid 1 is kept at the full-close position.

As will be understood from the foregoing description, in the automotive power sunroof of the present invention, the full-close condition of the lid is always achieved by pivoting the lid 1 upwardly from the so-called flap-down position. Thus, the full-close condition of the lid is neatly achieved without providing the weather strip with an outwardly projected unsightly lip.

What is claimed is:

1. A power sunroof for a motor vehicle, comprising:
   first means for defining a sunroof opening in a roof of the vehicle;
   a lid sized to close said sunroof opening, said lid being provided around its periphery with a weather strip;
   second means for permitting said lid to have a tilt-up position, a full-close position, a flap-down position and a full-open position, said tilt-up position being a position wherein said lid is tilted up with respect to said sunroof opening, said full-close position being a position wherein said lid is snugly received in said sunroof opening with said weather strip operatively compressed therebetween, said flap-down position being a position wherein said lid is tilted down with respect to said sunroof opening, and said full-open position being a position wherein said lid gets under said roof substantially fully opening said sunroof opening;
   a drive mechanism including an electric motor, said drive mechanism being capable of driving, when said motor is energized, said lid to assume said tilt-up, full-close, flap-down and full-open positions selectively; and
   third means including an electric control circuit which, by energizing said motor, automatically moves said lid through said full-close position from said tilt-up position to said flap-down position and automatically reverses said motor to again achieve said full-close position.

2. A power sunroof as claimed in claim 1, in which said third means comprises:
   a full-close detecting switch which detects the full-close position of said lid;
   a flap-down detecting switch which detects the flap-down position of said lid; and
   a control circuit for controlling said drive motor in accordance with information signals issued from said full-close detecting and flap-down detecting switches.

3. A power sunroof as claimed in claim 2, in which said control circuit includes a holding circuit which is designed to keep the running of said drive motor in one direction to pivot said lid from said tilt-up position toward said flap-down position even when said full-close detecting switch detects the full-close position of said lid.

4. A power sunroof as claimed in claim 3, wherein said flap-down detecting switch detects the arrival of said lid at the flap-down position.

5. A power sunroof as claimed in claim 4, in which said control circuit further includes:
 a first switch contact;
 a second switch contact;
 a tilt-operation switch manually operated to permit said first and second switch contacts to assume ON and OFF conditions respectively;
 a tilt-up control circuit which, when said first switch contact assumes ON condition, controls said drive motor to run in an opposite direction to pivot said lid upwardly from said full-close position to said tilt-up position; and
 a tilt-down control circuit which controls said lid in such a manner when said second switch contact assumes ON condition, said drive motor runs in the one direction to pivot said lid downwardly from said tilt-up position toward said flap-down position, and when said flap-down detecting switch detects the flap-down position of said lid, said drive motor runs in the opposite direction to pivot said lid upwardly from said flap-down position toward said full-close position.

6. A power sunroof as claimed in claim 5, in which said control circuit further includes:
 a slide-open control circuit having a slide-open contact;
 a slide-close control circuit having a slide-close contact; and
 a slide operation switch selectively contactable with said slide-open and slide-close control circuits to permit them to assume ON and OFF conditions,
 wherein when said slide-open control circuit assumes the ON condition, said drive motor runs in the one direction to move said lid to said full-open position, and when said slide-close control circuit assumes the ON condition, the drive motor runs in the opposite direction to move said lid from said full-open position to said full-close position through said flap-down position.

7. A power sunroof as claimed in claim 1, in which said third means comprises:
 a full-close detecting switch which detects the full-close position of said lid;
 a timer circuit incorporated with said full-close detecting switch, said timer circuit being kept OFF for a given time from the time when electrically energized, and turned ON upon expiration of the given time; and
 a control means for controlling said drive motor in accordance with information signals issued from said full-close detecting switch and said timer circuit.

8. A power sunroof as claimed in claim 7, in which said control circuit includes a holding circuit which is designed to keep the running of said drive motor in one direction to pivot said lid from said tilt-up position toward said flap-down position even when said full-close detecting switch detects the full-close position of said lid.

9. A power sunroof as claimed in claim 8, in which said control circuit is so designed as to change the rotation direction of said drive motor when said timer circuit counts a predetermined time after the time when said full-close detecting switch detects the full-close position of said lid upon arrival of said lid at said full-close position from said tilt-up position.

10. A power sunroof as claimed in claim 9, in which said control circuit further includes:
 a first switch contact;
 a second switch contact;
 a tilt-operation switch manually operated to permit said first and second switch contacts to assume ON and OFF conditions respectively;
 a tilt-up control circuit which, when said first switch contact assumes the ON condition, controls said drive motor to run in an opposite direction to pivot said lid upwardly from said full-close position to said tilt-up position; and
 a tilt-down control circuit which controls said lid in such a manner that when said second switch contact assumes the ON condition, said drive motor runs in the one direction to pivot said lid downwardly from said tilt-up position toward said flap-down position, and when said full-close detecting switch detects the full-close position of said lid, said timer circuit becomes ON thereby to keep the operation of said drive motor in the one direction until the expiration of the time determined by said timer circuit, and when said timer circuit becomes OFF, said drive motor is energized to run in the opposite direction to pivot said lid upwardly to said full-close position.

11. A power sunroof as claimed in claim 10, in which said control circuit further includes:
 a slide-open control circuit having a slide-open contact;
 a slide-close control circuit having a slide-close contact; and
 a slide operation switch selectively contactable with said slide-open and slide-close control circuits to permit them to assume ON and OFF conditions,
 wherein when said slide-open control circuit assumes the ON condition, said drive motor runs in the one direction to move said lid to said full-open position, and when said slide-close control circuit assumes the ON condition, the drive motor runs in the opposite direction to move said lid from said full-open position to said full-close position.

* * * * *